United States Patent
Desai et al.

(10) Patent No.: US 11,694,437 B1
(45) Date of Patent: Jul. 4, 2023

(54) COMPUTER VISION BASED SAFETY HAZARD DETECTION

(71) Applicant: Amazon Technologies, Inc., Seattle, WA (US)

(72) Inventors: Jay Manishbhai Desai, Seattle, WA (US); Santhosh Mani, Seattle, WA (US); Bo Wang, Redmond, WA (US); Kausic Gunasekar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 195 days.

(21) Appl. No.: 17/192,557

(22) Filed: Mar. 4, 2021

(51) Int. Cl.
*G06V 20/20* (2022.01)
*G06T 1/00* (2006.01)
*G06T 7/11* (2017.01)
*G06V 20/64* (2022.01)
*G05B 19/4061* (2006.01)

(52) U.S. Cl.
CPC ......... *G06V 20/20* (2022.01); *G05B 19/4061* (2013.01); *G06T 1/0014* (2013.01); *G06T 7/11* (2017.01); *G06V 20/64* (2022.01)

(58) Field of Classification Search
CPC ........ G06V 20/20; G06V 20/64; G06V 40/16; G06V 20/46; G06V 40/172; G06V 20/44; G06V 40/20; G06T 7/11; G06T 1/0014; G06T 7/70; G06T 7/20; G06T 2207/30196; G06T 2207/10016; G06T 2207/30201; G05B 19/4061; H04N 7/185; H04N 7/188; G08B 21/22
See application file for complete search history.

(56) References Cited

U.S. PATENT DOCUMENTS

| | | | |
|---|---|---|---|
| 11,436,827 B1 * | 9/2022 | Ho | G06V 20/20 |
| 2014/0119604 A1 * | 5/2014 | Mai | G06T 7/11 |
| | | | 382/103 |
| 2021/0192915 A1 * | 6/2021 | Johnson | H04W 4/021 |

OTHER PUBLICATIONS

Abushahma, Rema Ibrahim Hamad, et al. "Region-based convolutional neural network as object detection in images." 2019 IEEE 7th Conference on Systems, Process and Control (ICSPC). IEEE, 2019. (Year: 2019).*
Hariyono, Joko, and Kang-Hyun Jo. "Detection of pedestrian crossing road." 2015 IEEE International Conference on Image Processing (ICIP). IEEE, 2015. (Year: 2015).*

* cited by examiner

*Primary Examiner* — Amandeep Saini
(74) *Attorney, Agent, or Firm* — K&L Gates LLP

(57) ABSTRACT

Devices and techniques are generally described for computer vision techniques for safety hazard detection. A frame of image data representing a physical environment is received. In some examples, a first object represented in the frame of image data may be detected. A determination may be made that the first object is of a first class. A first zone represented in the frame of image data may be identified. The first zone may correspond to a ground surface of the physical environment. A determination may be made that the first object at least partially overlaps with the first zone. A first rule associated with the first zone may be determined. The first rule may restrict objects of the first class from being present within the first zone. Output data may be generated indicating that the first object is at least partially within the first zone, in violation of the first rule.

20 Claims, 7 Drawing Sheets

COMPUTER VISION BASED SAFETY HAZARD DETECTION

BACKGROUND

Safety hazards within the workplace or other physical location can lead to dangerous situations and/or accidents that can cause injury, property damage, and/or loss of life. Accordingly, safety standards may be put in place to define safety protocols and/or prohibited actions in order to alleviate dangerous conditions. Inspectors may monitor worksites and/or other physical locations to detect and/or remediate dangerous and/or prohibited activities and/or situations. The removal of potential safety hazards leads to safer and more efficient working conditions.

DETAILED DESCRIPTION

Figure 1:
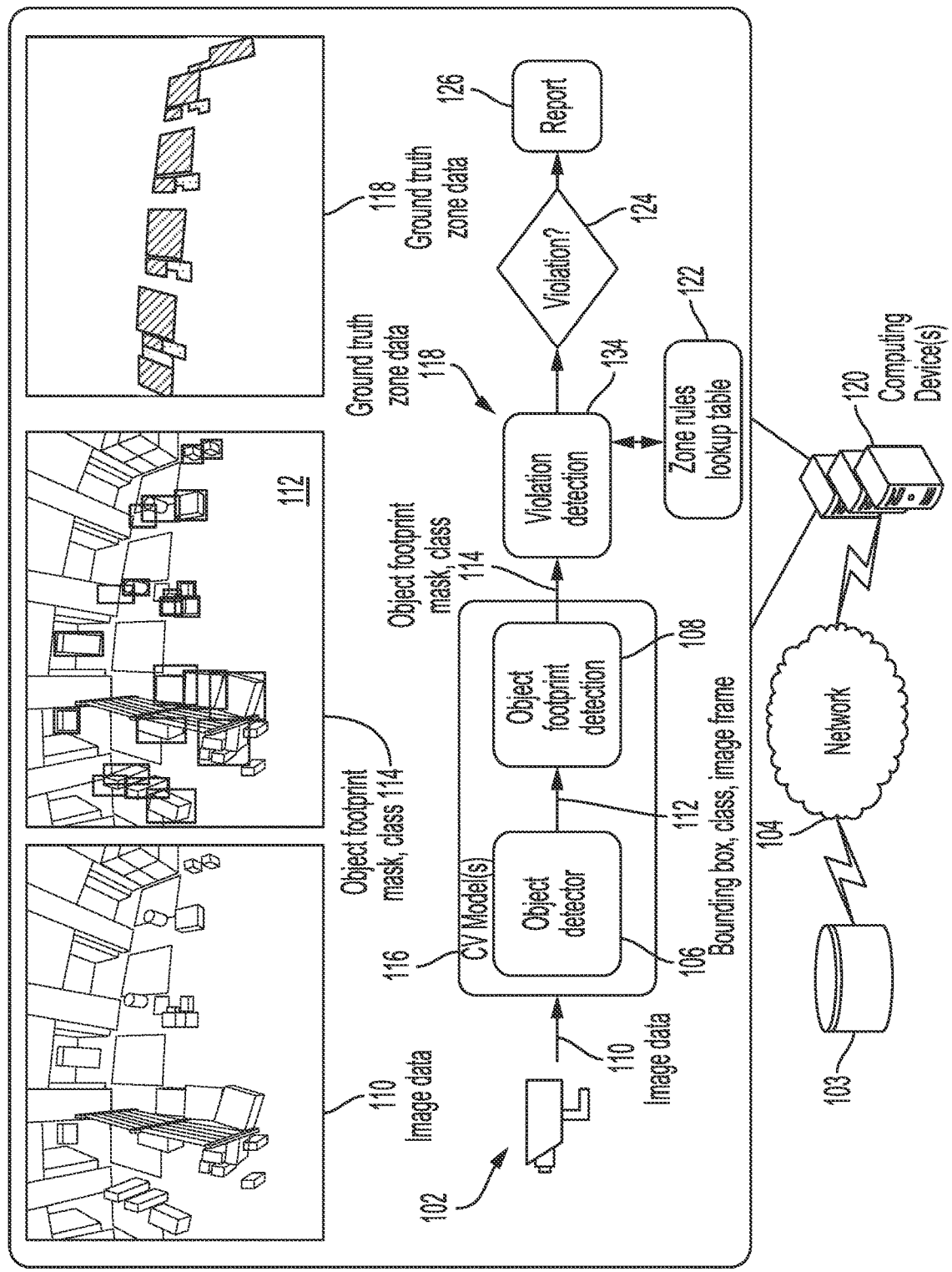
FIG. 1 is a diagram of an example system configured to perform computer vision based safety hazard detection, according to various embodiments of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Many work environments have conditions that could pose dangers to personnel and/or equipment if not controlled to maintain safe working conditions. For example, warehouse environments have a need to maintain evacuation routes that are kept clear for personnel egress during a fire or other emergency. Monitoring the facilities for potential safety hazards and following up with the proper corrective actions to remediate the safety hazards helps ensure safe working conditions for the employees and also can protect the entity from various liabilities due to injury and/or equipment damage that may otherwise result from safety hazards.

However, manually monitoring for safety hazards by on-site personnel is laborious, time-consuming, and expensive. Additionally, the detection of a hazard may be a subjective decision that may vary from one individual to another and the safety hazard check may not be performed in a standardized manner. Further, safety personnel may be unable to identify potential safety hazards as such prior to the dangerous condition leading to an accident.

To address these issues, described herein is an automated safety monitoring tool using computer vision to identify potential safety hazards. The input to the various computer vision techniques described herein may be frames of image data captured by process-monitoring cameras that are typically already present on site. The various techniques described herein may help to monitor regions prone to high injury and/or loss rates. Safety may be ensured by adherence to organizational policies that may be coded as rules, as described herein. Such policies may dictate the different zones where specific objects are permitted to be present and zones where such objects are not permitted. In some cases, the different zones may be defined using manual, visual demarcations on facility floors. For example. A zone may be a painted and/or taped off lane for personnel movement. Different zones may be color coded and/or otherwise distinguishable from different types of zone. For example, a first zone may be painted with yellow and black stripes indicating that personnel should not remain within the zone due to some hazard. Another zone may be a green lane representing a personnel pathway for traveling within the facility.

The various computer vision techniques described herein may include deep-learning technologies using object detection models. The computer vision model(s) may obtain frames of image data from one or more cameras placed throughout the monitored facility. Deep learning based models may detect objects belonging to one or more different classes on which the object detector has been trained in order to identify the spatial positions of the objects in the pixel domain. Additionally, the object detector may determine the class of object detected (e.g., person, palette, trash bin, forklift, etc.). Different ground truth zone data may identify different zone types and may be provided to the various safety hazard monitoring systems described herein. In some examples, the ground truth zone data may identify manually-demarcated zones obtained from human annotations. In various examples, such zones may be converted to top-down views of such zones to remove inaccuracies that may result from varied camera perspectives. In some examples, the spatial position of the objects in the pixel space may also converted to the same top-down perspective and the different objects may be classified as being present inside or outside the zones. As described in further detail below, an object may be determined to be inside a zone if at least one pixel that is determined to correspond to a footprint of the object (e.g., a point of contact between the object and the floor or ground surface of the physical environment) overlaps with at least one pixel corresponding to a zone.

Frames of image data may be organized into two-dimensional grids of pixels. A pixel of a frame may thus refer to a particular position within the two dimensional grid and may, in some cases, be identified using x, y coordinates of the grid. Accordingly, if a pixel of the footprint of an object is determined to be at the same location (in the 2D pixel grid) as a pixel of a zone, the object is determined to at least partially overlap with—or "be present within"—the zone. Conversely, if no pixel of the footprint of an object is determined using the various techniques described herein to be at the same location as a pixel of the zone, then the object is determined to be not located within (or overlap with) the zone.

The cameras of a given facility may have various different viewpoints and perspectives. This may lead to some difficulty in determining the area of contact between a particular object that has been detected in a frame of image data (e.g., using an object detector) and the ground (e.g., the object's "footprint"). Accordingly, various techniques are described for automatically estimating the footprint of an object that has been detected so that a determination may be made as to whether the object overlaps with any zones. In some examples, a perspective transformation may be applied to obtain a top-down view of both the detected objects and the zones. However, in other implementations described herein, it may be unnecessary to transform the perspective of the detected objects and zones. For example, a segmentation model may be trained based on human annotated images to detect the pixel-wise footprint of objects in the same space as the zones, without using a perspective transformation.

If a given object has been determined to at least partially overlap with a given zone, zone identifier data (e.g., a class of the zone) may be used to perform a lookup to determine applicable rules for the particular zone. The rules, as described in further detail below, may define permissible and impermissible classes of objects within the zone. Accordingly, if an impermissible class of object is determined to be within the zone, a violation may be detected. Output data (e.g., a report) may be generated that may identify per-zone violations, classes of violating objects, data regarding the prevalence of violations (e.g., per-zone), etc. The output data may be presented in various different ways and/or may be parseable in various manners in order to determine common safety hazards that may need remedial measures. For example, the number of safety hazards may be aggregated and the information may be shared with the responsible personnel through a dashboard for faster action, enabling faster and more scalable solutions for monitoring and/or remediating safety hazards.

Machine learning techniques, such as those described herein, are often used to form predictions, solve problems, recognize objects in image data for classification, etc. For example, herein machine learning techniques may be used to detect the location and class of objects represented within frames of image data. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram of an example system 100 configured to perform computer vision based safety hazard detection, according to various embodiments of the present disclosure. As depicted in FIG. 1, computing device(s) 120 may include a non-transitory computer-readable memory 103 and/or may be configured in communication with non-transitory computer-readable memory 103, such as over network 104. In some examples, non-transitory computer-readable memory 103 may store instructions that, when executed by at least one processor of computing device(s) 120, may be effective to perform one or more of the various techniques described herein. In various examples, network 104 may represent a local area network (LAN) and/or a wide area network (WAN) such as the internet. Computing device(s) 120 may be effective to implement system 100. In various examples, system 100 may be configured in communication with (and/or may include) one or more cameras 102. Cameras 102 may be cameras configured to capture image data representing a physical environment such as a designated work place (e.g., a warehouse, fulfillment center, laboratory, etc.). Cameras 102 may capture image and/or video data. Video data may comprise a plurality of frames of image data. Generally, video data and/or image data captured by cameras 102 is described herein as image data 110.

In the example of FIG. 1, image data 110 represents a scene within a warehouse-like environment. The warehouse environment may have various zones that include physical demarcations within the physical environment (e.g., visual indicators, such as colored strips and/or other markings that distinguish zones from one another and from undesignated spaces). In various examples, human annotators may label some frames of image data 110 to generate ground truth zone data 118. The ground truth zone data 118 may define different zones present within the image data 110. For example, for each different class or type of zone the human annotator may label the frame of image data to denote the location within the frame of the zone and the class or type of the zone. For example, the human annotator may draw a bounding box around the zone. The bounding boxes may be of any shape to conform to the shape of the zone as represented in the frame of image data 110. Additionally, the human annotator may label the class or type of the zone. For example, a first zone may be described as a "green zone." The green zone may be associated with a personnel walkway. The different zone types may be associated with different rules that may be specific to the particular zone type.

For example, the aforementioned green zone may have a rule specifying that it is impermissible to leave palettes within the green zone (e.g., for greater than some threshold amount of time), but that it is permissible for personnel to be within the green zone. A different zone (e.g., an orange zone) may be permissible for trash or recycling bins, but may not permit any other object type to be within the orange zone. Although the previous examples distinguish zones by color, other ways of denoting the different zones are possible (e.g., different patterns painted onto the floor and/or different floor textures) and are contemplated herein. In the example depicted in FIG. 1, ground truth zone data 118 may demarcate the location and/or classification of different zones.

In various other examples, instead of receiving human annotation data denoting the location (within a frame) and classification of a particular zone, an object detector (e.g., object detector 106 or another object detector), and/or a semantic segmentation model, may be trained to detect the location and classification of different zones without human input. For example, the aforementioned human-labeled ground truth zone data may be used to train a semantic segmentation model to detect the various zones. However, in many examples, since the zones are typically static in nature it may be advantageous to simply provide the human-labeled ground truth zone data 118, as opposed to training a semantic segmentation model or other model to detect the zones.

Computer vision models 116 of system 100 may include an object detector 106 and/or an object footprint detection model 108. Although depicted in FIG. 1 as two separate components, in some examples, both object detection and object footprint detection may be performed by a single model trained in an end-to-end fashion. Object detector 106 may be a deep learning model (e.g., a convolutional neural network (CNN) such as a single shot detector (SSD), You Only Look Once (YOLO), regional proposal and/or attention-based CNN (e.g., an R-CNN), etc. Object detector 106 may be trained to detect and distinguish between various classes of objects. The particular objects for which object detector 106 is trained to detect are implementation specific and may largely depend on the particular physical environment for which system 100 is being used. For example, in a warehouse type environment, objects may include different types of bins, personnel, forklifts and/or scissor-lifts, palettes (empty and stacked), inventory, etc. Object detector 106 may locate the different objects (e.g., by drawing a bounding box around the different objects) and may classify each detected object as one of the classes for which the object detector 106 has been trained. The output of object detector 106 may be bounding box(es), class(es), and the image frame 112 (e.g., labeled with the bounding box(es) and/or per-bounding box class identifiers).

The bounding box(es), class(es), and the image frame 112 may be input into an object footprint detection model 108. The object footprint detection model 108 may be trained to generate per-object footprint mask. A per-object footprint mask identifies, for each object, an area of contact between that object and the floor/ground surface of the physical environment. Various different approaches for determining an object's footprint are described in further detail below in reference to FIG. 2. As previously described, in some cases instead of having a separate object detector 106 and object footprint detection model 108, computer vision model(s) 116 may be a single model that is trained end-to-end to detect the location of objects, classify the detected objects, and determine the footprint (e.g., the (pixel-wise) location of the area of contact between the object and the floor within the frame of image data). In some examples, object footprint detection model 108 may be implemented as a semantic segmentation model that may generate segmentation masks (e.g., pixel-wise masks) representing the estimated footprints of the various detected objects in the scene represented by image data 110.

The output of computer vision model(s) 116 (and/or of object footprint detection model 108 in the multi-model implementation) may be object footprint mask and class data 114. The object footprint mask may represent the pixel location of the area of the object that has been determined to be in contact with the floor of the physical environment, as represented by groupings of pixels within the frame of image data. The class data may be the class of the different object footprint masks (e.g., person, palette, forklift, etc.).

The object footprint mask and class data 114 may be sent to violation detection component 134. The violation detection component 134 may receive the ground truth zone data 118. The violation detection component 134 may determine, for each zone, whether one or more object footprint masks at least partially overlaps with the zone. Violation detection component 134 may use data identifying the particular zone (e.g., zone ID data) to perform a lookup of the particular rules for that class/type of zone. Using the rules, the violation detection component 134 may determine those object classes that are permissible and those object classes that are impermissible within the zone.

For example, ground truth zone data 118 may include two different zones for frames from camera 1—red zones and blue zones. Violation detection component 134 may lookup the rules for red zones and blue zones using zone rules lookup table 122. Violation detection component 134 may determine that it is impermissible for any objects to remain within the red zone. Accordingly, if the object footprint mask for any detected object overlaps with pixels denoted by ground truth zone data 118 as pertaining to a red zone, a violation is detected at decision step 124. Violation detection component 134 may determine that blue zones allow personnel and palettes, but do not permit forklifts. Accordingly, pixels of object footprint masks that pertain to detected palettes may overlap with pixels corresponding to blue zones without constituting a violation, but pixels of object footprint masks that pertain to detected forklifts are determined to be a violation when such pixels overlap with pixels of a blue zone.

After determining the list of violations, system 100 may generate a report 126 (e.g., report data). The report 126 may list all violations for each zone. Additionally, the report 126 may comprise an annotated frame of image data depicting the violations and may include a description of the violation. For example, a forklift within a blue zone may be highlighted and annotated to describe that forklifts are not permitted within blue zones.

Figure 2:
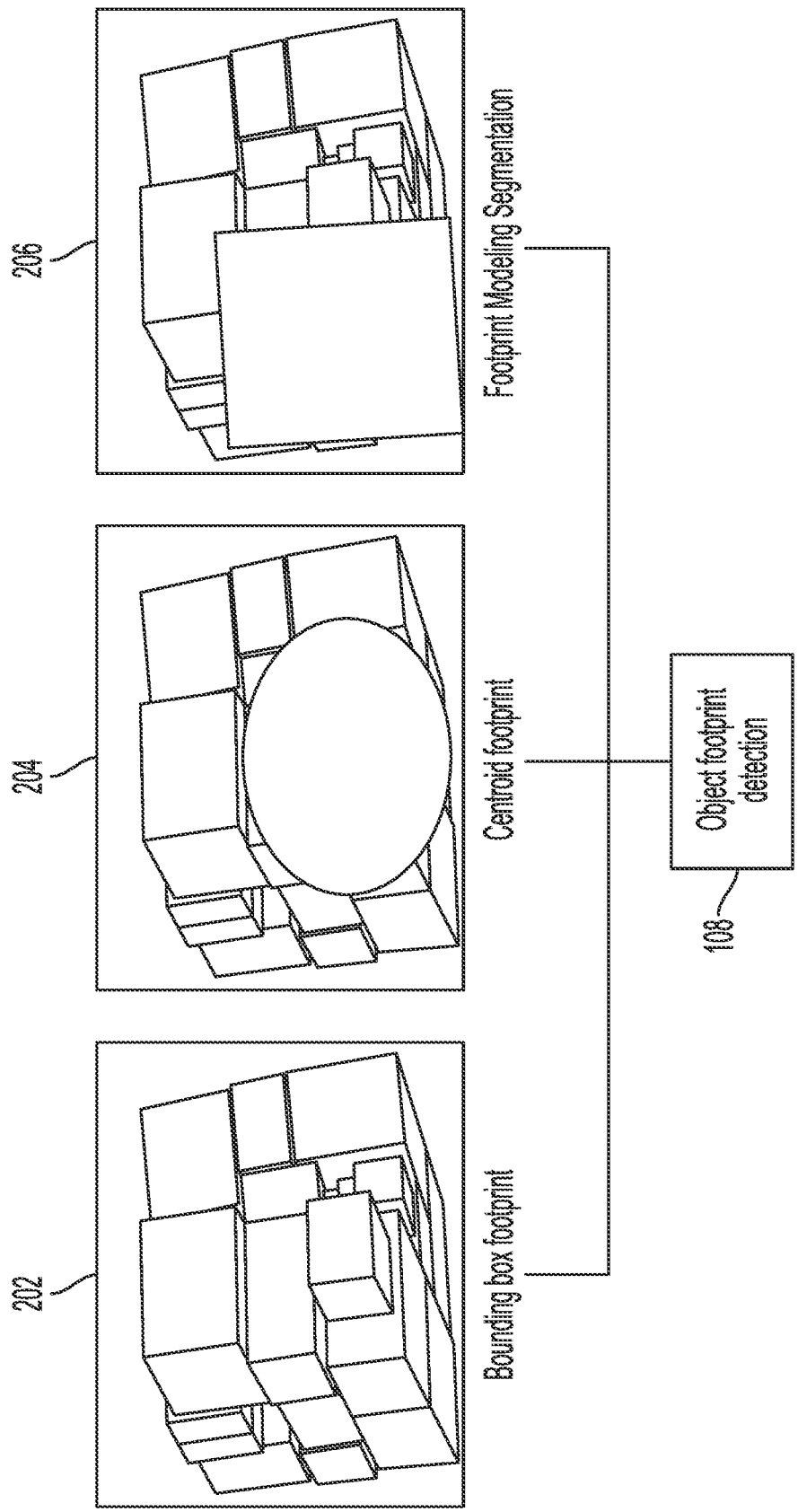
FIG. 2 illustrates various techniques for determining object footprints using computer vision, in accordance with various embodiments of the present disclosure.

FIG. 2 illustrates various techniques for determining object footprints using computer vision, in accordance with various embodiments of the present disclosure. Object footprint detection model 108 may determine object footprint masks for each object detected using object detection. As previously described, the object footprint masks may represent a plane of contact (represented by an area of contiguous pixels within the frame of image data) between the detected object and the ground. Accordingly, the object footprint masks may be compared to the pixel locations of the zones within a given frame of image data to determine if the object overlaps with one or more zones.

The perspectives of the object, object footprint, and zones change drastically depending on the camera angle and height of the object across different cameras and in cameras with very wide-angle views. Therefore, to estimate each object's plane of contact with the floor (e.g., the object footprint mask) and thereby determine overlap with the different zones, multiple methods may be used.

A first approach for generating object footprint masks is bounding box footprint 202 determination. In this approach the area confined by the bounding box output by the object detector 106 is used as the object footprint mask. The percentage of the object footprint mask (e.g., the percentage of overlapping pixels) may be determined for each zone. The specific rules for the zone may be used to determine if the percentage overlap constitutes a violation or not. For example, different classes of objects may have different threshold percentages of overlap that may be reached before an overlap of the object and the zone constitutes a violation. Since a bounding box typically surrounds more area than the actual area of contact between the object and the ground, such percentage thresholds may provide a way for estimating significant zone violations.

One benefit of using the bounding box footprint 202 determination approach is that the only error propagated through the pipeline is due to the object detection model. However, a potential drawback of such an approach is that the estimated footprint of an object is typically larger than the actual object's footprint, providing high recall, but low precision in detecting zone overlaps and violations.

Another approach for generating object footprint masks is centroid footprint 204 determination. In this approach, each object class is configured with custom centroid points and a circle's area with the centroid as the center of the circle is used as an object footprint. Then, to adjust for perspective differences, each zone may be converted from the shape of the zone given by the ground truth zone data 118 to a bird's eye view of the zone (e.g., a top-down view). A homography matrix may be determined from this transformation. The homography matrix may then be used to transform the centroid footprint mask of each object into the same perspective as the zone. The transformed centroid footprint masks and zones may be used to check for overlap. Benefits of the centroid footprint 204 determination approach include that the only error propagated through the system is from the object detection model and the configuration of the centroid and centroid radius. Additionally, transforming the zones and centroid footprint masks into top-down views removes some false information that is due to the camera perspective.

However, potential drawbacks to the centroid footprint 204 determination include that the estimated footprint could either be an over- or under-estimation of the true object footprint. Additionally, large perspective changes (e.g., for wide-angle views/cameras) can lead to a large divergence between the centroid footprint mask and the true object footprint resulting in low precision for violation determination.

Another approach for generating object footprint masks is a footprint modeling segmentation 206 method (e.g., an instance segmentation method). In such a method, humans label pixel-wise training data defining the footprint mask of each detected object. This training data is used to train an instance segmentation model (e.g., a mask R-CNN) to directly generate the object footprint mask for each detected object. In general segmentation, the entire object is typically labeled in training instances and a pixel-wise mask that distinguishes all pixels pertaining to the object from pixels pertaining to other objects or the background is generated. However, in an example implementation of footprint modeling segmentation 206, instance segmentation techniques may use training samples whereby human annotators estimate the objects footprint (e.g., the surface representing the estimated contact between the object and the ground) and generate pixel-wise labels for the estimated footprint of objects from potentially different camera perspectives. In various examples, synthetic training data may be generated using 3D computer-aided design (CAD) domain randomization to reduce the amount of human-annotation required. The object footprint mask is used with the ground truth zone data 118 to determine if there is overlap with a particular zone. Advantageously, because the zone data and the object footprint masks generated using this method are in the same pixel space, no perspective transformation need be performed as the instance segmentation model is able to map different perspectives and camera angles and estimate the different object footprints in the same domain as the ground truth zone data 118. However, one drawback to such an approach is that the human labeling of training data for the instance segmentation model may be time-consuming and expensive. However, some techniques may be used to synthetically generate such training data.

Figure 3:
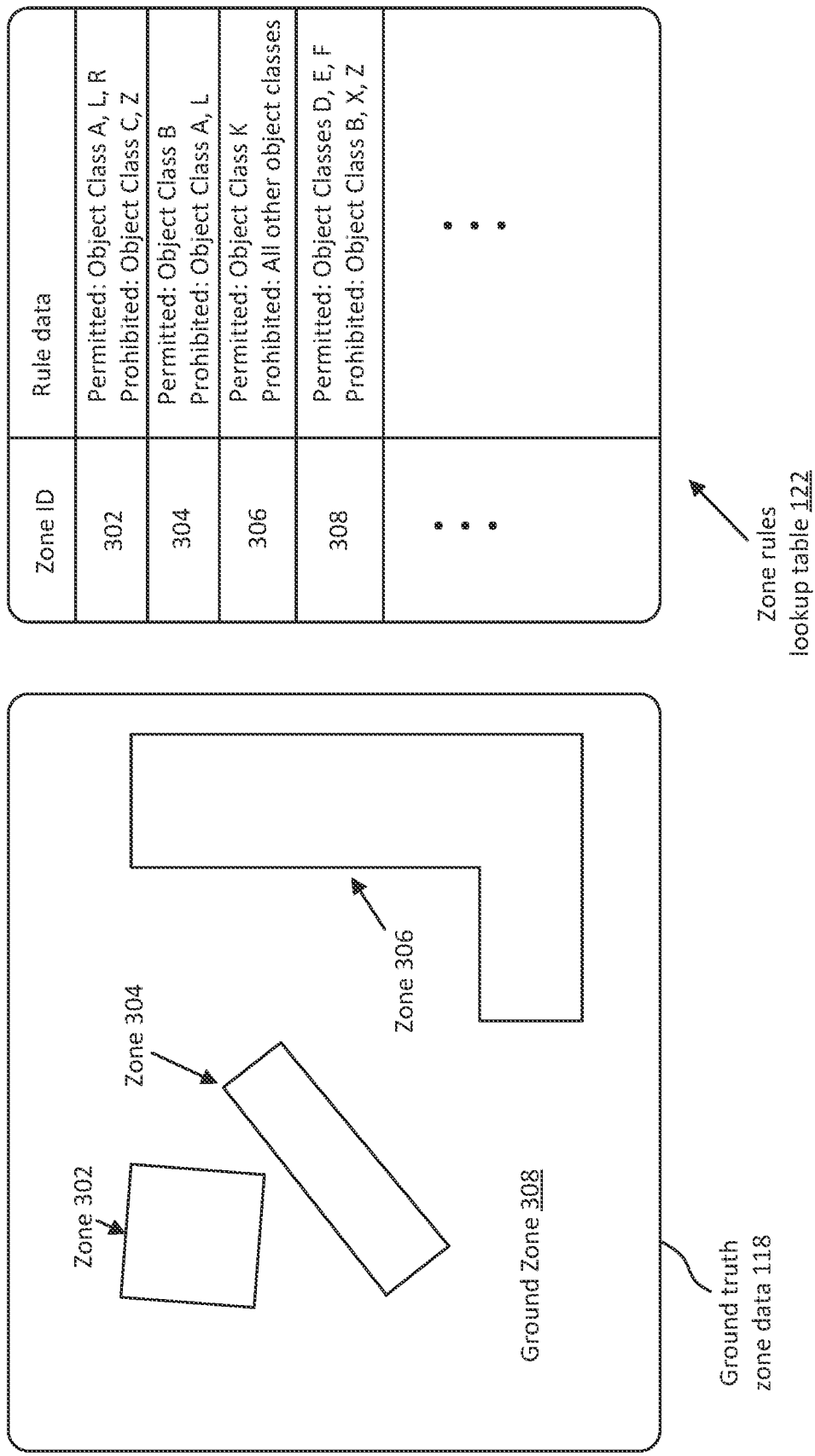
FIG. 3 illustrates determination of zone-specific safety rules, in accordance with various aspects of the present disclosure.

FIG. 3 illustrates determination of zone-specific safety rules, in accordance with various aspects of the present disclosure. In the example depicted in FIG. 3, the ground truth zone data 118 identifies the location of three different zones—zone 302, zone 304, and zone 306. As previously described, in other examples, the zone location and/or identifying data may be determined using an object detector; however, due to the typically static nature of zones in a physical environment it may be simpler to receive ground truth data labeling the location and/or classification of the zones. The ground truth zone data 118 may specify the location (e.g., a pixel wise mask indicating the pixels pertaining to each zone) of each zone and data identifying each zone (e.g., a class of each zone). In some cases, one of the zones (e.g., zone 308) may be a "ground zone," indicating that the zone 308 does not correspond to any of the other specialized zones. Accordingly, any portion of the ground surface that is not labeled as a particular zone in the ground truth zone data 118 may be classified as ground zone 308.

In the example depicted in FIG. 3, zone 302 may be associated with the Zone ID "302." The system 100 (e.g., the violation detection component 134 of system 100) may be effective to lookup rule data for zone 302 using zone rules lookup table 122. In the example depicted in FIG. 3, the rule data may specify permitted classes of objects and/or restricted classes of objects for the particular class of zone. In the example, zone 302 may permit objects of class A, L, and R, while prohibiting objects of class C and Z and/or restricting objects of classes C and Z to certain times. Accordingly, objects detected and determined to be of class A, L, and R may be at least partially overlapping with zone 302 without causing a violation. Conversely, each object detected and determined to be of class C and Z that is at least partially overlapping with zone 302 may result in an instance of a violation. As previously described, in some examples, the zone rule data may include tolerance thresholds. A tolerance threshold may describe a threshold overlap percentage for a prohibited (impermissible) object class. For example, for zone ID 302 and prohibited object class Z, there may be an associated threshold percentage of 50%. This may indicate that at least 50% of the pixels of a footprint of an object of class Z may be required to overlap with pixels of zone 302 prior to detection of a violation. Accordingly, if fewer than 50% of the pixels of the footprint of an object of class Z overlap with the zone 302, no violation may be detected. Such threshold percentages may be per object class and/or per zone, depending on the desired implementation. Additionally, the threshold percentages may be tunable where anywhere from 1 pixel overlap to total overlap (e.g., 100% overlap) may be required before detecting a violation, depending on the desired implementation. Ground zone 308 may also be associated with rule data, as shown.

Additionally, although not shown in FIG. 3, temporal thresholds may be associated with each zone and/or with each object class for each zone. For example, a temporal threshold may specify that, in order to determine a violation, a prohibited class of objects may be required to remain at least partially overlapping with a particular zone for at least 10 seconds or for at least a certain number of frames of video. Such temporal thresholds may provide fault tolerance for transient objects that are merely moving through or across a zone for a short period of time. Temporal thresholds are discussed in further detail below in reference to FIG. 4.

In the example depicted in FIG. 3, zone 304 may be associated with the Zone ID "304" in zone rules lookup table 122. The system 100 (e.g., the violation detection component 134 of system 100) may be effective to lookup rule data for zone 304 using zone rules lookup table 122. In the example, zone 304 may permit objects of class B, but may prohibit objects of class A and L. Accordingly, objects detected and determined to be of class B may be at least partially overlapping with zone 302 without causing a violation. Conversely, each object detected and determined to be of class A and L that is at least partially overlapping with zone 302 may result in an instance of a violation. For zone 306, only object class K is permitted and all other object classes are prohibited. The particular implementation of the zone rules lookup table 122 and its contents are highly implementation specific and may be tuned for the individual implementation and for the particular site being monitored.

Figure 4:
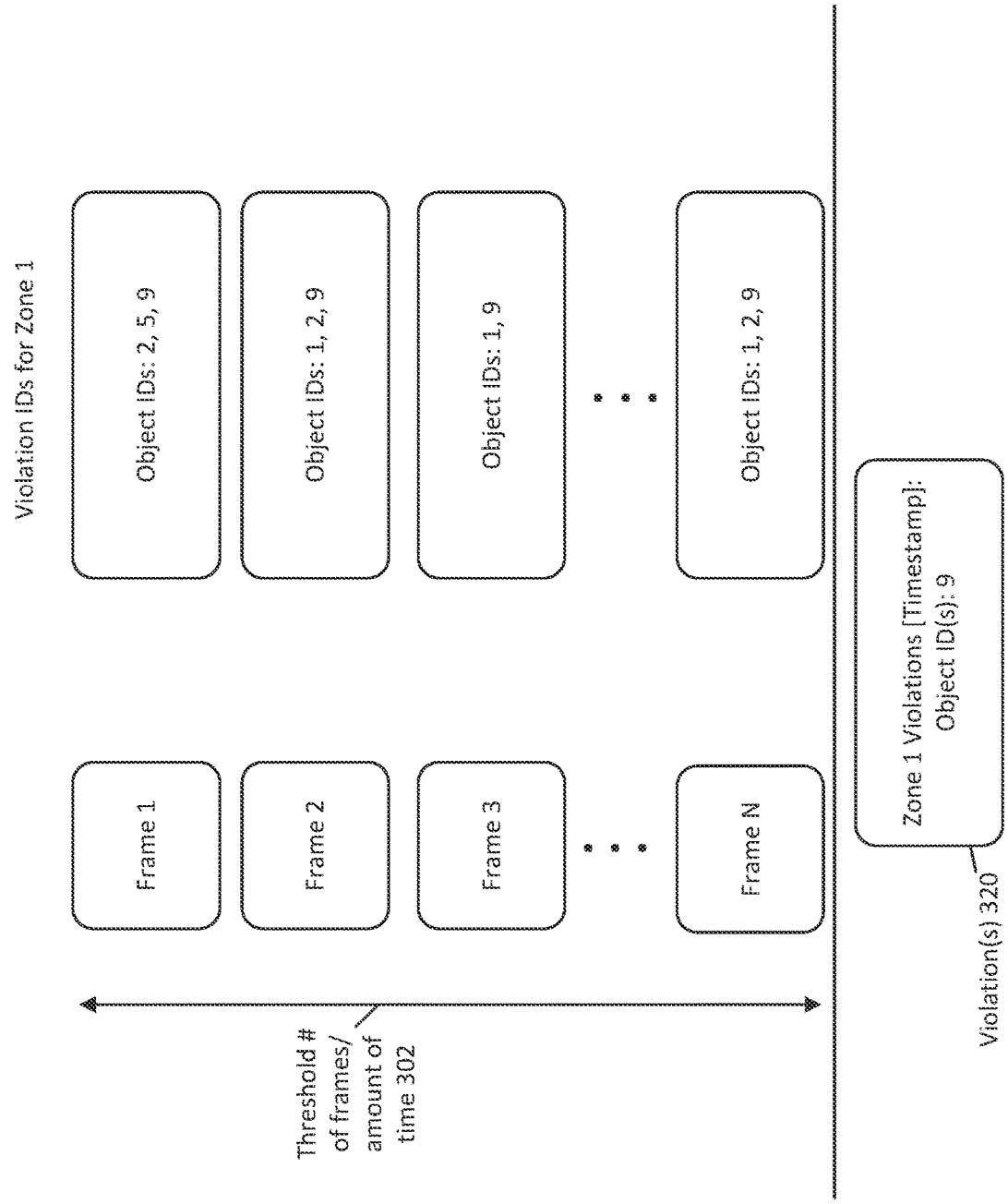
FIG. 4 illustrates violation detection including tolerance for moving objects, in accordance with various aspects of the present disclosure.

FIG. 4 illustrates violation detection including tolerance for moving objects, in accordance with various aspects of the present disclosure. As previously described, there may be a temporal threshold that may be associated with a particular zone and/or a particular class of objects that are prohibited to be within a particular zone. In the example depicted in FIG. 4, let it be assumed that there is a temporal threshold of N frames associated with any prohibited object that is located within zone 1 (e.g., any prohibited object that at least partially overlaps or which overlaps by more than a threshold degree with zone 1). In the example, for frame 1, prohibited objects 2, 5, and 9 are in violation of the rules associated with zone 1. For example, object classes 2, 5, and 9 are prohibited objects for zone 1 and are detected within zone 1 in frame 1. The frames 1-N may be frames sampled from a video feed and/or frames of image data captured at a particular frequency (e.g., 1 frame every 10 seconds, etc.).

In frame 2, objects 1, 2, and 9 are in violation. Accordingly, between frames 1 and 2, object 2 has moved out of zone 1 and is no longer in violation, while object 1 has entered zone 1 and is in violation. In frame 3, objects 1 and 9 are in violation. This indicates that objects 1 and 9 from frame 2 remain in violation, while object 2 has left zone 1 and is no longer in violation. At frame N, objects 1, 2, and 9 are in violation.

The temporal threshold of N frames may specify that a prohibited object should remain in violation of a lane rule for≥N frames in order to be detected as a violation 320 and to be included in an output of the system 100 (e.g., report 126). Accordingly, for frames 1-N, only object 9 has remained in violation of zone 1. Accordingly, the object ID of object 9 is included as an output violation 320. As previously described, the violations may be output in report 126 as text data and/or image data describing and/or showing the violation so that the situation can be recorded and/or remediated prior to an accident occurring. In various examples, the rules may optionally trigger an alert for particular violations of specified zones by specific prohibited objects.

Figure 5:
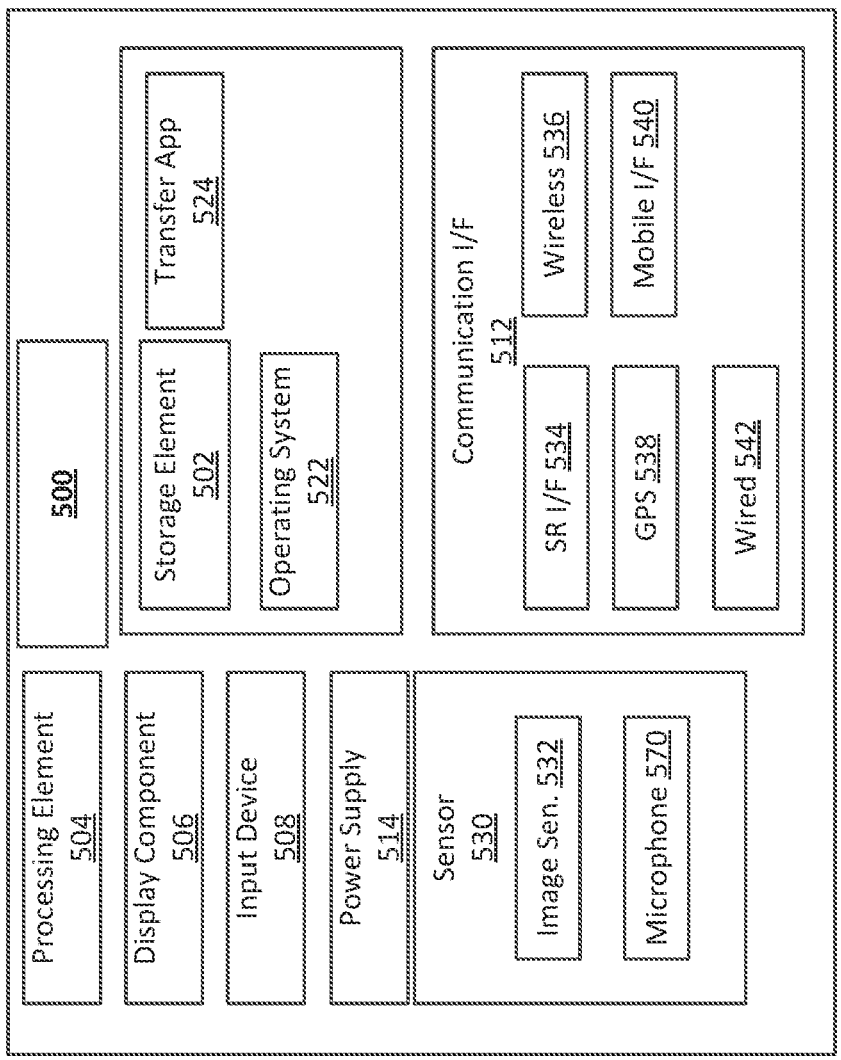
FIG. 5 is a block diagrams showing an example architecture of a computing device that may be used in accordance with various embodiments described herein.

FIG. 5 is a block diagram showing an example architecture 500 of a computing device that may be used in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks generated using the segmentation techniques described herein. In another example, storage element 502 may store one or more machine learning models (and/or parameters thereof) used for computer vision-based safety hazard detection (e.g., for object detection and/or footprint mask segmentation).

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or footprint segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
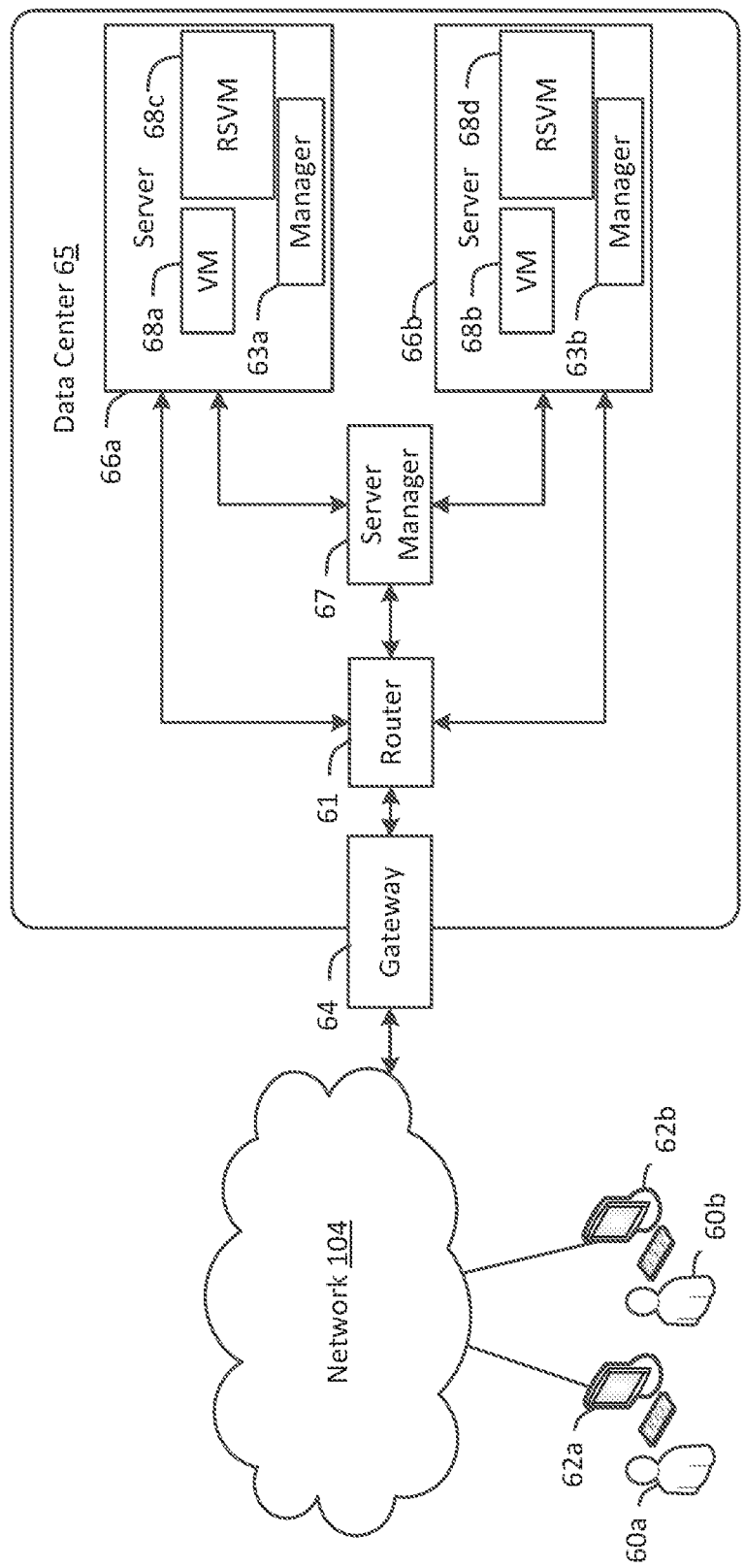
FIG. 6 is a diagram illustrating an example system for sending and providing data that may be used in accordance with the present disclosure.

An example system for sending and providing data that may be used to perform computer vision based safety hazard detection will now be described in detail. In particular, FIG. 6 illustrates an example computing environment in which the embodiments described herein may be implemented. For example, the computing environment of FIG. 6 may be configured to perform catalog computer-vision based hazard detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
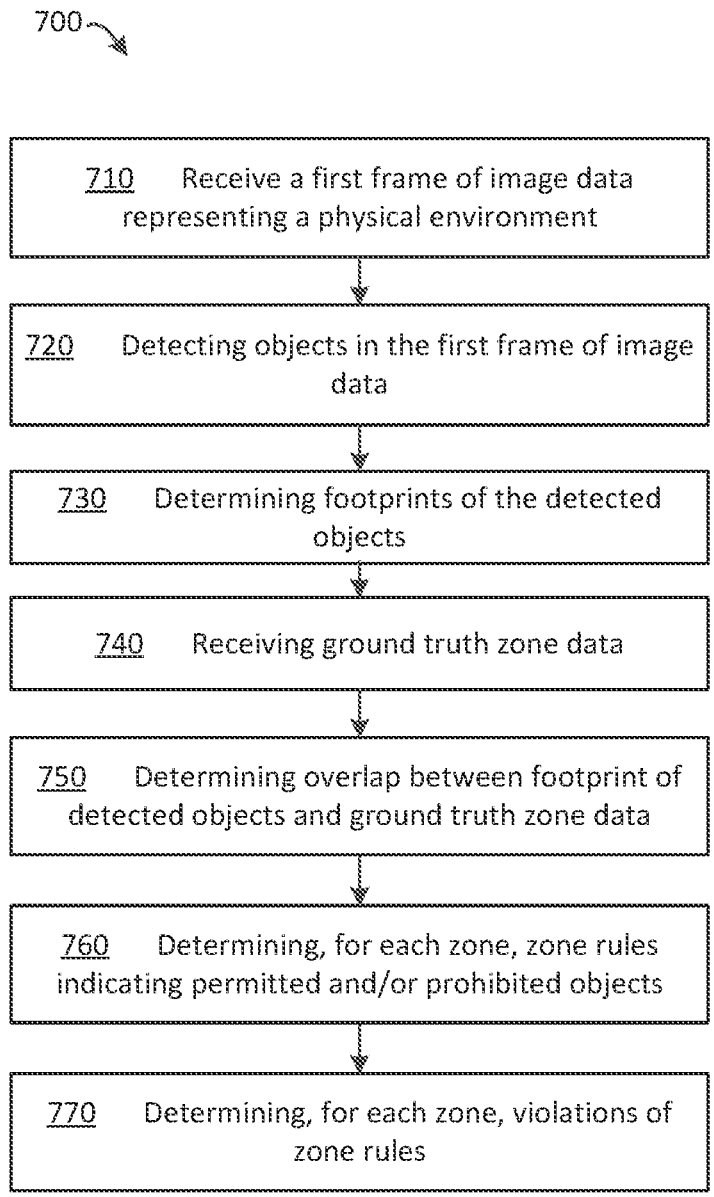
FIG. 7 is a flowchart describing an example process for computer vision based safety hazard detection, according to various aspects of the present disclosure.

FIG. 7 depicts a flow chart showing an example process 700 for computer vision based safety hazard detection, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a first frame of image data representing a physical environment may be received. In various examples, the first frame of image data may depict a physical environment that is being monitored for safety hazards using the various computer vision based techniques described herein.

Process 700 may continue from action 710 to action 720, at which objects may be detected within the first frame of image data. In various examples, the image data captured at action 710 may be sent to an object detector (e.g., object detector 106) as an input. The object detector may detect each object for which the object detector has been trained to detect. In addition to determining the location of each object (e.g., denoted using a bounding box), the object detector may determine a class of each object (e.g., forklift, palette, person, etc.).

Process 700 may continue from action 720 to action 730, at which footprints of the detected objects may be determined. In various examples, an instance segmentation model may be used to estimate the area of contact between each detected object and the floor/ground of the physical environment being monitored. In other examples, the bounding-box method and/or centroid detection method described herein may be used to determine the footprint of the detected objects.

Process 700 may continue to action 740, at which ground truth zone data may be received. The ground truth zone data may define a class of each zone (e.g., zone identifier data) and the location of each zone within the frame of image data. For example, a segmentation mask may be provided with pixels pertaining to a particular zone denoted as such (e.g., along with zone identifier data identifying the zone from among other zones and/or denoting a class of the zone). In various examples, the segmentation mask may identify borders of the zone within the frame of image data such that pixels pertaining to the zone may be distinguished from pixels that do not pertain to the zone.

Process 700 may continue to action 750, at which overlap between the footprint of detected objects and ground truth zone data may be determined. In various examples, the overlap may be determined by determining if one or more pixels of the object footprint mask for an object corresponds to the same pixel location within the frame as a pixel denoted to be part of a zone. As described herein, in various examples, in order to determine that a prohibited object constitutes a violation within a zone, there may be a threshold percentage of pixels of the object that overlap with pixels of the zone. For example, there may be a threshold percentage of 25% for a particular zone. Accordingly, at least 25% of the pixels of the object footprint mask of a prohibited object may be required to overlap with the zone in order for a zone violation to be detected.

Process 700 may continue to action 760, at which zone rules may be determined for each zone, where the zone rules indicate permitted and/or prohibited objects. At action 760, the zone rules may be looked up from a zone rules lookup table (e.g., zone rules lookup table 122). Zone identifier data (e.g., metadata included in the ground truth zone data 118 that may distinguish the zone from among other zones) may be used to query the zone rules lookup table to determine the rules associated with the particular zone. As previously described, in addition to potentially identifying permitted and/or prohibited object classes for the particular zone, the zone rule data may specify temporal thresholds and/or percentage thresholds. Such thresholds may be per-object class and/or per-zone. In some other examples, the zone rules may specify maximum speeds at which object-classes may be moved within the zone (e.g., movement thresholds). In general, the zone rule data may comprise any type of rule that may be discernable using the various computer-vision techniques described herein.

Process 700 may continue to action 770, at which the violations of zone rules may be determined for each zone. At action 770, violations of each zone may be determined, for example, by determining whether an object that is prohibited by the zone rules from being located within a zone is located in the zone. As previously described, in some cases, greater than a threshold percentage of the object footprint mask may be required to overlap with the zone in order for the overlap to constitute a violation. In some other examples, the object must be located within the zone for greater or equal to a threshold amount of time (e.g., a threshold time period) and/or number of frames in order to constitute a violation.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving a first frame of image data representing a physical environment;
detecting, using a computer vision model, a first object in the first frame of image data;
determining, using the computer vision model, that the first object is of a first class of objects;
determining a first zone represented in the first frame of image data, the first zone representing a first portion of the physical environment;
determining, from first pixel data corresponding to the first object in the first frame of image data, a footprint of the first object, the footprint representing an area of contact between the first object and a surface of the physical environment;
determining that the footprint of the first object at least partially overlaps with at least one pixel representing the first zone;
determining a first rule associated with the first zone, the first rule indicating that objects of the first class of objects are not permitted within the first zone; and
generating report data indicating a violation of the first rule for the first zone.

2. The method of claim 1, further comprising:
detecting, using a computer vision model, a second object in the first frame of image data;
determining, using the computer vision model, that the second object is of the first class of objects;
determining a second zone represented in the first frame of image data, the second zone representing a second portion of the physical environment;
determining that a footprint of the second object at least partially overlaps with the second zone;
determining a second rule associated with the second zone, the second rule indicating that objects of a second class of objects are not permitted within the second zone; and
determining that the second object is permitted within the second zone based at least in part on the second rule.

3. The method of claim 1, further comprising:
determining, using a segmentation model, the footprint of the first object, wherein the footprint comprises a segmentation mask comprising a plurality of contiguous pixels of the first frame of image data, the plurality of contiguous pixels representing an estimate of a contact between the first object and a floor of the physical environment; and
determining that the footprint of the first object at least partially overlaps with the first zone by determining that at least one pixel of the plurality of contiguous pixels is within the first zone.

4. A method comprising:
receiving, by at least one processor, a frame of image data representing a physical environment;
detecting, by the at least one processor, a first object represented in the frame of image data;
determining, by the at least one processor, that the first object is of a first class;
identifying, by the at least one processor, a first zone represented in the frame of image data, the first zone corresponding to a first region of the physical environment;
determining, by the at least one processor, an estimated footprint of the first object, the estimated footprint representing an area of contact between the first object and a surface of the physical environment;
determining, by the at least one processor, that the estimated footprint of the first object at least partially overlaps with the first zone;
determining, by the at least one processor, a first rule associated with the first zone, the first rule restricting objects of the first class from being present within the first zone; and
generating, by the at least one processor, output data indicating that the first object is at least partially within the first zone in violation of the first rule.

5. The method of claim 4, further comprising:
identifying, by the at least one processor, a second zone represented in the frame of image data, the second zone corresponding to a second region of the physical environment; and
determining, by the at least one processor, a second rule associated with the second zone, wherein the second rule restricts objects of a second class from being present within the second zone and allowing objects of the first class within the second zone.

6. The method of claim 4, further comprising:
receiving a plurality of frames of image data representing the physical environment over a first time period; and
determining that the first object is represented in each of the plurality of frames of image data and that a representation of the first object at least partially overlaps with the first zone in each of the plurality of frames of image data, wherein the output data is generated based at least in part on the representation of the first object at least partially overlapping with the first zone in each of the plurality of frames of image data representing the physical environment over the first time period.

7. The method of claim 4, further comprising:
identifying, by the at least one processor, a second zone represented in the frame of image data, the second zone corresponding to a different region of the physical environment;
determining, by the at least one processor, a second rule associated with the second zone, wherein the second rule restricts objects of a second class from being present within the second zone and allowing objects of the first class within the second zone;
detecting, by the at least one processor, a second object represented in the frame of image data;
determining, by the at least one processor, that the second object at least partially overlaps with the second zone;
determining, by the at least one processor, that the second object is of the first class; and
determining, by the at least one processor, that a location of the second object does not constitute a violation based at least in part on a class of the second object and the second rule.

8. The method of claim 4, further comprising:
determining, using a segmentation model, a plurality of pixels of the frame of image data representing an area of contact between the first object and a ground surface of the physical environment, wherein the plurality of pixels comprise the estimated footprint of the first object; and determining that the first object at least partially overlaps with the first zone based at least in part on at least one of the plurality of pixels being within the first zone.

9. The method of claim 4, further comprising:
determining the first class of the first object using an object detector; and
determining a second class of a second object represented in the frame of image data using the object detector, wherein the second class is different from the first class.

10. The method of claim 4, further comprising:
storing zone rule data in at least one non-transitory computer-readable memory, the zone rule data comprising a plurality of zones of the physical environment, wherein each zone of the plurality of zones is associated with rules defining permissible object classes permitted to be within the respective zone and impermissible object classes which are not permitted to be within the respective zone.

11. The method of claim 4, further comprising:
determining a bounding box surrounding the first object, wherein the bounding box is output by an object detector; and
determining the estimated footprint of the first object based at least in part on the bounding box.

12. The method of claim 4, wherein the frame of image data is a first frame of image data, the method further comprising:
receiving a second frame of image data representing the physical environment, wherein the second frame of image data is captured at a point in time that is after the first frame of image data;
detecting, by the at least one processor, the first object represented in the second frame;
determining, by the at least one processor, that the first object represented in the second frame does not overlap with the first zone; and
generating second output data indicating that the first object does not violate the first rule associated with the first zone.

13. A system comprising:
at least one processor; and
non-transitory computer-readable memory storing instructions that, when executed by the at least one processor, are effective to:
receive a frame of image data representing a physical environment;
detect a first object represented in the frame of image data;
determine that the first object is of a first class;
identify a first zone represented in the frame of image data, the first zone corresponding to a first region of the physical environment;
determine an estimated footprint of the first object, the estimated footprint representing an area of contact between the first object and a surface of the physical environment;
determine that the estimated footprint of the first object at least partially overlaps with the first zone;
determine a first rule associated with the first zone, the first rule restricting objects of the first class from being present within the first zone; and
generate output data indicating that the first object is at least partially within the first zone in violation of the first rule.

14. The system of claim 13, the non-transitory computer-readable memory storing further instructions that, when executed by the at least one processor, are further effective to:
identify a second zone represented in the frame of image data, the second zone corresponding to a second region of the physical environment; and
determine a second rule associated with the second zone, wherein the second rule restricts objects of a second class from being present within the second zone and allowing objects of the first class within the second zone.

15. The system of claim 13, the non-transitory computer-readable memory storing further instructions that, when executed by the at least one processor, are further effective to:
receive a plurality of frames of image data representing the physical environment over a first time period; and
determine that the first object is represented in each of the plurality of frames of image data and that a representation of the first object at least partially overlaps with the first zone in each of the plurality of frames of image data, wherein the output data is generated based at least in part on the representation of the first object at least partially overlapping with the first zone in each of the plurality of frames of image data representing the physical environment over the first time period.

16. The system of claim 13, the non-transitory computer-readable memory storing further instructions that, when executed by the at least one processor, are further effective to:
identify a second zone represented in the frame of image data, the second zone corresponding to a different region of the physical environment;
determine a second rule associated with the second zone, wherein the second rule restricts objects of a second class from being present within the second zone and allowing objects of the first class within the second zone;
detect a second object represented in the frame of image data;
determine that the second object at least partially overlaps with the second zone;
determine that the second object is of the first class; and
determine that a location of the second object does not constitute a violation based at least in part on a class of the second object and the second rule.

17. The system of claim 13, the non-transitory computer-readable memory storing further instructions that, when executed by the at least one processor, are further effective to:
determine, using a segmentation model, a plurality of pixels of the frame of image data representing an area of contact between the first object and a ground surface of the physical environment, wherein the plurality of pixels comprise the estimated footprint of the first object; and
determine that the first object at least partially overlaps with the first zone based at least in part on at least one of the plurality of pixels being within the first zone.

18. The system of claim 13, the non-transitory computer-readable memory storing further instructions that, when executed by the at least one processor, are further effective to:
determine the first class of the first object using an object detector; and determine a second class of a second object represented in the frame of image data using the object detector, wherein the second class is different from the first class.

19. The system of claim 13, the non-transitory computer-readable memory storing further instructions that, when executed by the at least one processor, are further effective to:

store zone rule data in the non-transitory computer-readable memory, the zone rule data comprising a plurality of zones of the physical environment, wherein each zone of the plurality of zones is associated with rules defining permissible object classes permitted to be within the respective zone and impermissible object classes which are not permitted to be within the respective zone.

20. The system of claim 13, the non-transitory computer-readable memory storing further instructions that, when executed by the at least one processor, are further effective to:

determine a bounding box surrounding the first object, wherein the bounding box is output by an object detector; and determine the estimated footprint of the first object based at least in part on the bounding box.

* * * * *